United States Patent
Halverson et al.

(10) Patent No.: US 11,392,899 B2
(45) Date of Patent: Jul. 19, 2022

(54) MANAGING CONDENSATION WITH ANGLED FLUID CONTROL FEATURES

(71) Applicant: 3M INNOVATIVE PROPERTIES COMPANY, St. Paul, MN (US)

(72) Inventors: Kurt J. Halverson, Lake Elmo, MN (US); Raymond P. Johnston, Lake Elmo, MN (US); Caleb T. Nelson, Woodbury, MN (US); Steven P. Swanson, Blaine, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 404 days.

(21) Appl. No.: 15/305,863

(22) PCT Filed: Apr. 23, 2015

(86) PCT No.: PCT/US2015/027338
§ 371 (c)(1),
(2) Date: Oct. 21, 2016

(87) PCT Pub. No.: WO2015/164632
PCT Pub. Date: Oct. 29, 2015

(65) Prior Publication Data
US 2017/0045285 A1 Feb. 16, 2017

Related U.S. Application Data

(60) Provisional application No. 61/983,585, filed on Apr. 24, 2014.

(51) Int. Cl.
*C08J 5/18* (2006.01)
*G06Q 10/10* (2012.01)

(52) U.S. Cl.
CPC ............ *G06Q 10/1053* (2013.01); *C08J 5/18* (2013.01); *Y10T 428/14* (2015.01)

(58) Field of Classification Search
CPC ......... B25G 1/102; A63B 60/12; A63B 60/14; G06Q 10/1053; Y10T 428/14; C08J 5/18
See application file for complete search history.

(56) References Cited

U.S. PATENT DOCUMENTS

| 4,152,165 A | 5/1979 | Beck |
| 4,579,555 A | 4/1986 | Russo |

(Continued)

FOREIGN PATENT DOCUMENTS

EP 0934756 8/1999

OTHER PUBLICATIONS

Alonso-Amigo, "Polymer Microfabrication for Microarrays, Microreactors and Microfluidics" Journal of Laboratory Automation, Dec. 15, 2000, pp. 96-101.

(Continued)

*Primary Examiner* — Patricia L. Nordmeyer
(74) *Attorney, Agent, or Firm* — Qiang Han

(57) ABSTRACT

An article comprises a structure having an outer surface extending along a longitudinal axis. At least a portion of a cross section of the outer surface is convex. Fluid control channels extend along a channel longitudinal axis along at least a portion the convex surface. The channel longitudinal axis makes an angle between 0 and 90 degrees with respect to the longitudinal axis of the outer surface. The fluid control channels are configured to allow capillary movement of liquid in the channels and across the convex surface.

7 Claims, 9 Drawing Sheets

(56) References Cited

U.S. PATENT DOCUMENTS

| | | | |
|---|---|---|---|
| 5,514,120 | A | 5/1996 | Johnston |
| 5,585,186 | A | 12/1996 | Scholz |
| 5,728,446 | A | 3/1998 | Johnston |
| 6,372,323 | B1 | 4/2002 | Kobe |
| 6,372,954 | B1 | 4/2002 | Johnston |
| 6,375,871 | B1 | 4/2002 | Bentsen |
| 6,381,846 | B2 | 5/2002 | Insley |
| 6,420,622 | B1 | 7/2002 | Johnston |
| 6,531,206 | B2 | 3/2003 | Johnston |
| 6,609,981 | B2 * | 8/2003 | Hirata .............. A01K 87/00 473/316 |
| 6,746,567 | B2 | 6/2004 | Johnston |
| 6,803,090 | B2 | 10/2004 | Castiglione |
| 6,907,921 | B2 | 6/2005 | Insley |
| 7,308,803 | B2 | 12/2007 | Brokaw |
| 7,909,264 | B2 | 3/2011 | Dunne |
| 8,122,909 | B2 | 2/2012 | Tonkovich |
| 2002/0146540 | A1 | 10/2002 | Johnston |
| 2003/0211291 | A1 | 11/2003 | Castiglione |
| 2005/0106360 | A1 | 5/2005 | Johnston |
| 2007/0139451 | A1 | 6/2007 | Somasiri |
| 2009/0242048 | A1 | 10/2009 | Sherman |
| 2012/0273000 | A1 | 11/2012 | Jing |

OTHER PUBLICATIONS

Gelest Inc, "Hydrophobicity, Hydrophilicity and Silane Surface Modification", May 24, 2010, pp. 1-82.
EP Extended Search Report, EP 15763237, dated Nov. 14, 2017 (13 pages).
International Search Report for PCT International Application No. PCT/US2015/027338, dated Aug. 19, 2015, 5 pages.

* cited by examiner

MANAGING CONDENSATION WITH ANGLED FLUID CONTROL FEATURES

TECHNICAL FIELD

This application relates generally to fluid control layers and methods for managing condensation.

BACKGROUND

The collection of liquid within an infrastructure can cause long term problems if it is not dealt with in an appropriate manner. Specifically, water condensation can be very problematic within building infrastructure, causing increased humidity, mold or mildew-related contamination, water damage, safety hazards, and corrosion. The damage caused by water condensation can result in expensive repairs, spoilage of products, and even serious illness due to mold or bacterial infestation.

SUMMARY

Some embodiments discussed herein involve an article that comprises an outer configured to manage liquid. The article includes a structure having an outer surface that extends along a longitudinal axis. At least a portion of the outer surface of the structure is convex in cross section. Fluid control channels extend along at least a portion of the convex outer surface and run along a channel longitudinal axis. The channel longitudinal axis makes an angle between 0 and 90 degrees with respect to the longitudinal axis of the outer surface. The fluid control channels are configured to allow capillary movement of liquid in the channels and across the convex outer surface of the structure.

Some embodiments are directed to an elongated fluid control layer that has a layer longitudinal axis. The fluid control layer includes channels that extend along a channel longitudinal axis wherein the channel longitudinal axis makes an angle of less than 45 degrees with respect to the layer longitudinal axis. The channels are dimensioned and arranged to provide capillary forces that overcome the gravitational force on water in the channels and cause capillary movement of the water in the channels and across the fluid control layer in opposition to the gravitational force.

Some embodiments involve a fluid control layer comprising channels extending across the fluid control layer and along a channel longitudinal axis. The channels are configured to provide capillary movement of fluid in the channels and across the fluid control layer. At least some of the channels have a first opening at a first edge of the fluid control layer and a second opening at a second edge of the fluid control layer that intersects the first edge. A thickness of the fluid control layer at the openings is configured to provide capillary movement of the fluid into the channels.

Some embodiments are directed to a process for forming a fluid control film. A flowable material and a molding surface of a molding tool are continuously brought into contact with each other. Microchannels are formed within the flowable material. The flowable material is solidified to form an elongated fluid control film, the fluid control film having a length along a longitudinal axis and a width, the length being greater than the width. The microchannels are formed along a channel longitudinal axis and the channel longitudinal axis makes an angle greater than 0 and less than 90 degrees with respect to the longitudinal axis of the fluid control film.

The above summary is not intended to describe each disclosed embodiment or every implementation of the present disclosure. The figures and the detailed description below more particularly exemplify illustrative embodiments.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Water condensation can be problematic in the operation of manufacturing and processing plants. In particular, managing condensation can be difficult in situations that require regular cleaning, for example, high pressure cleaning and sanitizing with hot water and/or liquid cleaning solutions. Persistent condensation can cause structural damage due to water damage and/or corrosion, can cause environmental damage due to mold and mildew, and provides a breeding ground for bacteria. Mold, mildew and bacterial infestation can lead to serious illness.

Embodiments discussed herein involve fluid transport surfaces that enable rapid evaporation of condensation.

Fluid transport features containing hydrophilic microreplicated capillary structures allow the spreading of liquid droplets or condensation over a larger area. The increase in surface to volume of liquid ratio increases the evaporation rate and promotes more rapid drying.

Fluid transport surfaces as described herein can be particularly effective when used on largely horizontal structures that may accumulate liquids, for example ceilings or the underside of overhead pipes. The accumulation of liquid in these areas may be a result of natural condensation or from liquids being dispersed on the surface, for example for cleaning purposes. On largely horizontal surfaces, condensate droplets tend to persist for prolonged periods of time unless additional condensation mitigation efforts are made, such as mopping the ceiling and overhead pipes.

Fluid transport surfaces discussed below are configured to wick the hanging droplets into hydrophilic microreplicated channels and to disperse the liquid by capillary action across the fluid transport surface, thus significantly increasing the surface to volume ratio of the liquid and promoting evaporation. Fluid transport features on a horizontally oriented structure having a convex outer surface, such as a pipe, provide a capillary wicking direction that has component orthogonal to the direction of the gravitational force. In some embodiments, the fluid transport features may direct the condensate fluid to designated locations. These locations may be chosen based on drainage points or designated drip points. The designated drip points may direct the condensate fluid away from underlying sensitive equipment such as food processing lines. Generally, the susceptibility of a solid surface to be wet out by a fluid is characterized by the contact angle that the fluid makes with the solid surface after being deposited on the horizontally disposed surface and allowed to stabilize thereon. It is sometimes referred to as the "static equilibrium contact angle," sometimes referred to merely as "contact angle." In general, hydrophilic materials form a contact angle with water that is less than 90 degrees.

Figure 1A:
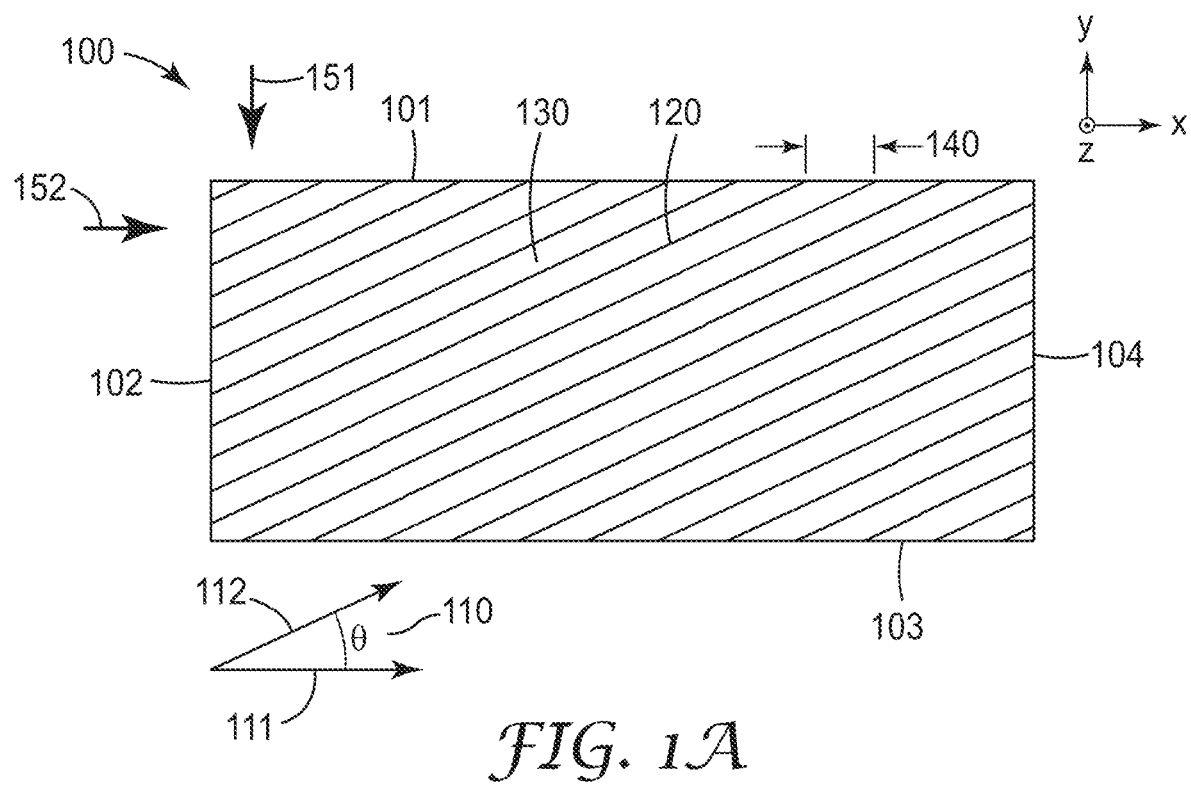
FIG. 1A illustrates a fluid control layer with angled channels in accordance with embodiments disclosed.

FIG. 1A illustrates an elongated fluid control layer with flow channels (microchannels) that are disposed at an angle, θ, with respect to a longitudinal axis of the fluid control layer, the x-axis in FIG. 1A. Fluid control layer 100 includes an array of channels 130 that extend across the fluid control layer 100 along a channel longitudinal axis 112. Ridges 120 rise above the surface of the fluid control layer 100 along the z axis to form the channels 130, with each channel 130 having a ridge 120 on either side running along the channel longitudinal axis 112. In some embodiments, each set of adjacent ridges 120 are equally spaced apart. In other embodiments, the spacing of the adjacent ridges 120 may be at least two different distances apart. A longitudinal axis 111 of the fluid control layer 100 intersects with the channel longitudinal axis 112 to make a channel angle 110. The angle 110 may be between 0 and 90 degrees. In some embodiments, the channel angle 110 is less than about 45 degrees. In some embodiments, the channel angle 110 is between about 5 degrees and about 30 degrees, or about 5 degrees to about 20 degrees or about 10 degrees to about 15 degrees. In some embodiments, the channel angle 110 is about 20 degrees.

The channels 130 are configured to provide capillary movement of fluid in the channels 130 and across the fluid control layer 100. The capillary action wicks the fluid to disperse it across the fluid control layer 100 so as to increase the surface to volume ratio of the fluid and enable more rapid evaporation. The dimensions of the channel openings 140 can be configured to wick fluid that collects at an edge 101, 102, 103, 104 of the fluid control layer 100 into the channels 130 by capillary action. The channel cross section 130, 230, 231, 330, channel surface energy, and fluid surface tension determines the capillary force. The land thickness $t_v$ provides a ledge that can impede liquid acquisition. Preferably the land thickness is kept to a minimum to encourage rapid liquid acquisition. Small channel angles 110 provide larger the openings 140 at the top and bottom edges 101, 103 which run along the longitudinal axis of the fluid control layer 100 as shown in FIG. 1A. Larger openings 140 of the channels 130 results in fewer openings 140 per unit of length along the top and bottom edges 101, 103 of the fluid control layer 100.

Each channel 130 in the fluid control layer 100 has a first opening at a first edge of the fluid control layer 100 and a second opening at a second edge of the fluid control layer 100. For example, the first opening may be located on a first edge 101 and the second opening may be located on a second edge 102 that is adjacent and intersects the first edge 101. In this example, the first and second opening may be the same size or different sizes depending on the channel angle 110. Fluid can enter the fluid control layer 100 at the first edge along a first direction 151 and can enter the fluid control layer 100 at a second edge along a second direction 152. As another example, the first opening may be located on a first edge 102 and the second opening may be located on an opposing edge 103. In some embodiments, the channel openings 140 are present on all four edges 101-104 of the fluid control layer 100. This arrangement provides a plurality of openings 140 for droplets to enter the channels 130 and then disperse within the channels 130 of the fluid control layer 100.

Figure 1B:
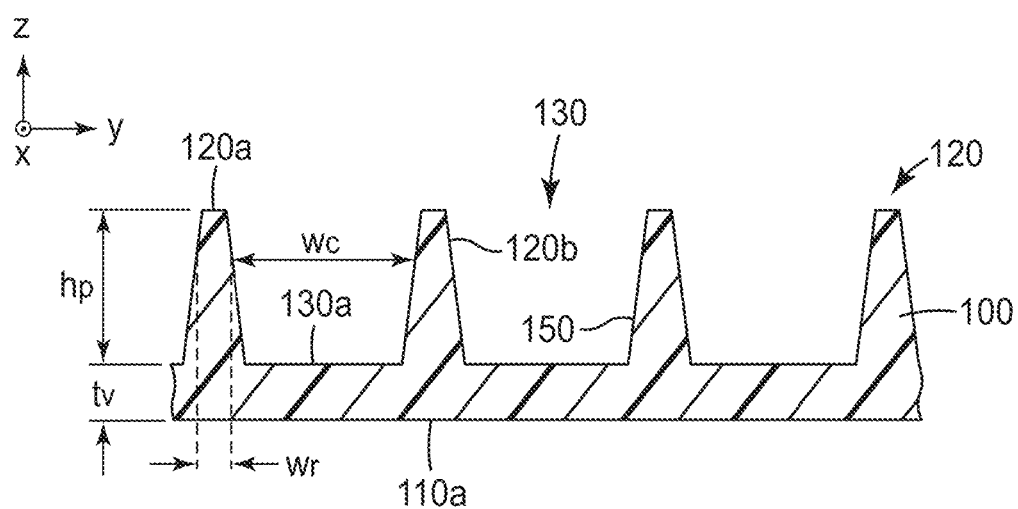
FIG. 1B illustrates a cross section of the fluid control layer of an example embodiment.

FIG. 1B illustrates a cross section of fluid control layer 100. The channels 130 of the fluid control layer 100 are defined by first and second ridges 120 disposed on either side of the channel 130. As shown in FIG. 1B, in some embodiments the ridges 120 can extend along the z-axis, generally normal to the bottom surface 130a of the channel 130. Alternatively, in some embodiments, the ridges can extend at a non-perpendicular angle with respect to the bottom surface of the channel. The first and second primary ridges 120 have a height $h_p$ that is measured from the bottom surface 130a of the channel 130 to the top surface 120a of the ridges 120. The ridge height $h_p$ may be selected to provide durability and protection to the fluid control layer 100. In some embodiments, the ridge height $h_p$ is about 25 μm to about 3000 μm, the cross sectional channel width, $w_c$, is about 25 μm to about 3000 μm, and the cross sectional ridge width, $w_r$, is about 30 μm to about 250 μm.

In some embodiments, as shown in FIG. 1B, the side surfaces 120b of the channels 130 may be sloped in cross section so that the width of the ridge at the bottom surface 130a of the channel is greater than the width of the ridge at the top surface 120a of the ridges 120. In this scenario, the width of the channel 130 at the bottom surface 130a of the channel is less than the width of the channel 130 at the top surface 120a of the ridges 120. Alternatively, the side surfaces of the channels could be sloped so that the channel width at the bottom surface of the channel is greater than the channel width at the top surface of the ridges.

The fluid control layer 100 has a thickness $t_v$ measured from the bottom surface 110a of the fluid control layer 100 to the bottom surface of the channel 130a. The thickness $t_v$ can be selected to allow liquid droplets to be wicked into the fluid control layer 100 but still maintain a robust structure. In some embodiments, the fluid control layer thickness $t_v$ is less than about 75 μm thick, or between about 20 μm to about 200 µm. A hydrophilic coating 150 may be disposed, e.g., plasma deposited, on the microstructured surface of the fluid control layer 100.

Figure 2A:
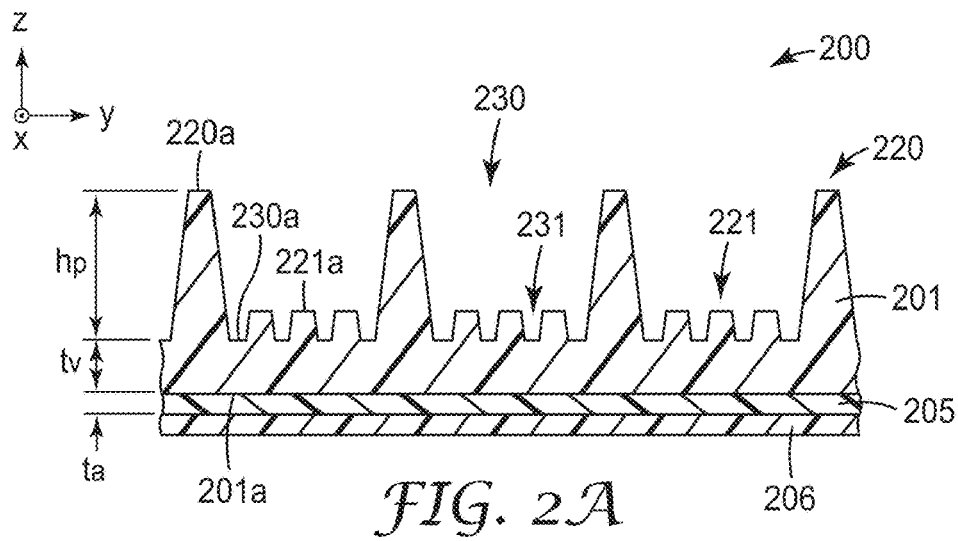
FIGS. 2A and 2B illustrate a cross section of a fluid control layer with primary and secondary channels according to an example embodiment.
Figure 2B:
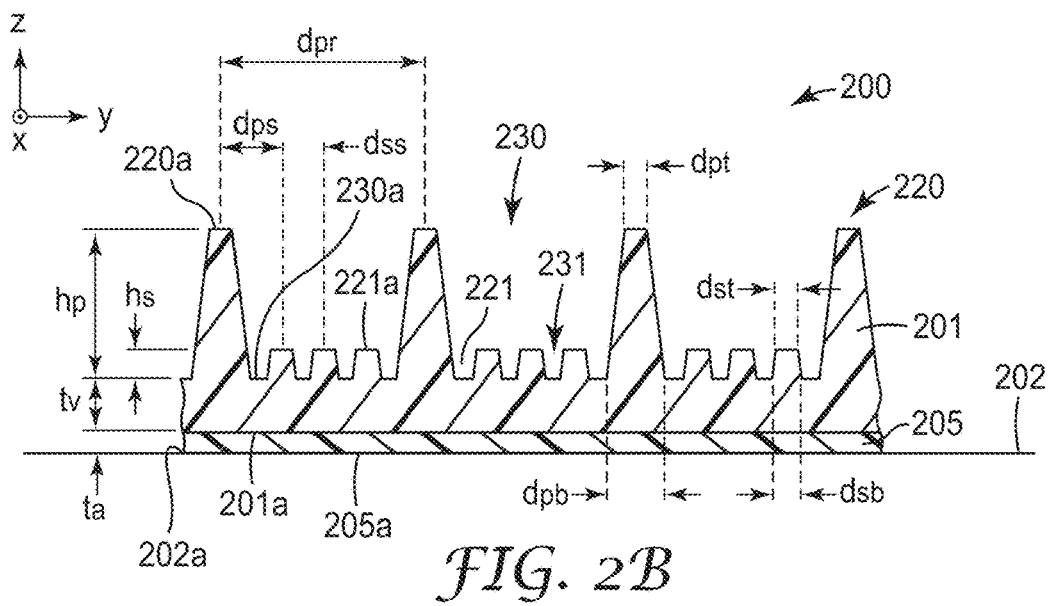

FIGS. 2A and 2B are cross sections of a fluid control device 200 according to an example embodiment. The fluid control device 200 shown in FIG. 2A includes a fluid control film, an optional adhesive layer 205 and an optional release layer 206 disposed on the surface of the adhesive layer opposite the fluid control layer 201. The release layer 206 may be included to protect the adhesive layer 205 prior to the application of the adhesive layer 205 to the external surface 202. FIG. 2B shows the fluid control device 200 installed on an external surface 202 with the release layer removed.

The fluid control device 200 comprises a fluid control layer 201 having primary and secondary channels 230, 231 defined by primary and secondary ridges 220, 221, wherein the channels 230, 231 and ridges 220, 221 run along a channel axis that makes an angle, θ, with respect to the longitudinal axis of the fluid control layer 201, e.g., the x-axis as previously discussed in connection with FIG. 1A. Each primary channel 230 is defined by a set of primary ridges 220 (first and second) on either side of the primary channel 230. The primary ridges 220 have a height $h_p$ that is measured from the bottom surface 230a of the channel 230 to the top surface 220a of the ridges 220.

In some embodiments, microstructures are disposed within the primary channels 230. In some embodiments, the microstructures comprise secondary channels 231 disposed between the first and secondary primary ridges 220 of the primary channels 230. Each of the secondary channels 231 is associated with at least one secondary ridge 221. The secondary channels 231 may be located between a set of secondary ridges 221 or between a secondary ridge 221 and a primary ridge 220.

The center-to-center distance between the primary ridges, $d_{pr}$, may be in a range of about 25 µm to about 3000 µm; the center-to-center distance between a primary ridge and the closest secondary ridge, $d_{ps}$, may be in a range of about 5 µm to about 350 µm; the center-to-center distance between two secondary ridges, $d_{ss}$, may be in a range of about 5 µm to about 350 µm. In some cases, the primary and/or secondary ridges may taper with distance from the base. The distance between external surfaces of a primary ridge at the base, $d_{pb}$, may be in a range of about 15 µm to about 250 µm and may taper to a smaller distance of $d_{pt}$ in a range of about 1 µm to about 25 µm. The distance between external surfaces of a secondary ridge at the base, $d_{sb}$, may be in a range of about 15 µm to about 250 µm and may taper to a smaller distance of $d_{st}$ in a range of about 1 µm to about 25 µm. In one example, $d_{pp}$=0.00898 inches, $d_{ps}$=0.00264 inches, $d_{ss}$=0.00185 inches, $d_{pb}$=0.00251 inches, $d_{pt}$=0.00100 inches, $d_{sb}$=0.00131 inches, $d_{st}$=0.00100 inches, $h_p$=0.00784 inches, and $h_s$=0.00160 inches.

The secondary ridges have height $h_s$ that is measured from the bottom surface 230a of the channel 230 to the top surface 221a of the secondary ridges 221. The height $h_p$ of the primary ridges 220 may be greater than the height $h_s$ of the secondary ridges 221. In some embodiments the height of the primary ridges is between about 25 µm to about 3000 µm and the height of the secondary ridges is between about 5 µm to about 350 µm. In some embodiments, a ratio of the secondary ridge 221 height $h_s$ to the primary ridge 220 height $h_p$ is about 1:5. The primary ridges 220 can be designed to provide durability to the fluid control layer 200 as well as protection to the secondary channels 231, secondary ridges and/or or other microstructures disposed between the primary ridges 220.

The fluid control device 200 may also have an adhesive layer 205 disposed on the bottom surface 201a of the fluid control layer 201. The adhesive layer 205 may allow the fluid control layer 200 to be attached to some external surface 202 to help manage liquid dispersion across the external surface. The combination of an adhesive layer 205 and the fluid control layer 201 forms a fluid control tape. The adhesive layer 205 may be continuous or discontinuous. The tape 200 may be made with a variety of additives that, for example, make the tape flame retardant and suitable for wicking various liquids including neutral, acidic, basic and/or oily materials.

The fluid control layer 201 is configured to disperse fluid across the surface of the fluid control layer 201 to facilitate evaporation of the fluid. In some embodiments, the adhesive layer 205 may be or comprise a hydrophobic material that repels liquid at the interface 202a between the adhesive layer 205 and the external surface 202, reducing the collection of liquid at the interface 202a.

The adhesive layer 205 has a thickness $t_a$ and the fluid control layer 201 has a thickness $t_v$ from the bottom surface 230a of the channels 230, 231 to the bottom surface 201a of the fluid control layer 201. In some embodiments, the total thickness between the bottom surface 230a of the channels 230, 231 and the bottom surface 205a of the adhesive layer 205, $t_v+t_a$ can be less than about 300 µm, e.g., about 225 µm. This total thickness $t_v+t_a$ may be selected to be small enough to allow liquid to be efficiently wicked from the external surface 202 through the channel openings at the edges of the fluid control layer 201 and into the channels 230, 231.

Figure 3:
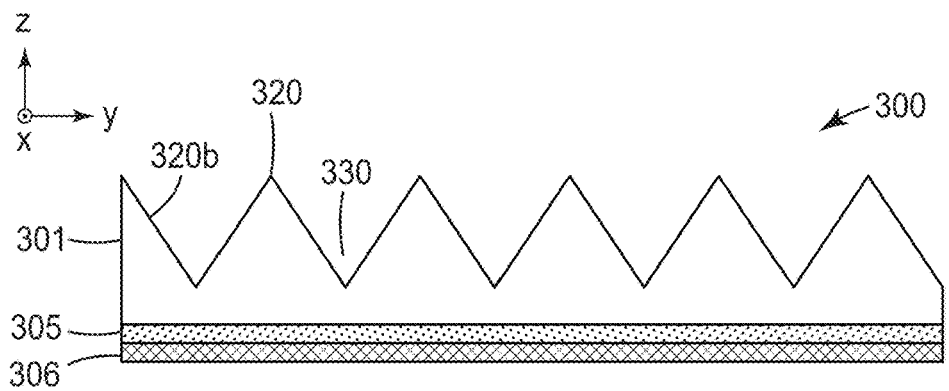
FIG. 3 illustrates a cross section of a fluid control layer with ridges and channels according to an example embodiment.

FIG. 3 illustrates a cross section of a fluid control device 300 with ridges and channels according to an example embodiment. The fluid control layer 301 includes channels 330 that are v-shaped with ridges 320 that define the channels 330. In this embodiment, the side surfaces 320b of the channels are disposed at an angle with respect to the axis normal to the layer surface, i.e., the z axis in FIG. 3. As previously discussed, the channels 330 and ridges 320 of the fluid control layer 301 run along a channel axis that makes an angle, θ, with respect to the longitudinal axis of the fluid control layer 301, e.g., the x-axis as previously discussed in connection with FIG. 1A. The ridges 320 may be equal distance apart from one another. The fluid control layer 301 may have an adhesive layer 305 disposed on the bottom surface of fluid control layer 301. As previously discuss in connection with FIG. 2A, fluid control device 300 may also include a release layer 306 disposed on the adhesive layer 305.

The microchannels described herein may be replicated in a predetermined pattern that form a series of individual open capillary channels that extending along a major surface of the fluid control layer. These microreplicated channels formed in sheets or films are generally uniform and regular along substantially each channel length, for example from channel to channel. The film or sheet may be thin, flexible, cost effective to produce, can be formed to possess desired material properties for its intended application and can have, if desired, an attachment means (such as adhesive) on one side thereof to permit ready application to a variety of surfaces in use.

The fluid control layers discussed herein are capable of spontaneously transporting fluids along the channels by capillary action. Two general factors that influence the ability of fluid control layers to spontaneously transport fluids are (i) the geometry or topography of the surface (capillarity, size and shape of the channels) and (ii) the nature of the film surface (e.g., surface energy). To achieve the desired amount of fluid transport capability the designer may adjust the structure or topography of the fluid control film and/or adjust the surface energy of the fluid control film surface. In order for a channel to function for fluid transport by spontaneous wicking by capillary action, the channel is generally sufficiently hydrophilic to allow the fluid to wet the surfaces of the channel with a contact angle between the fluid and the surface of the fluid control layer equal or less than 90 degrees.

In some implementations, the fluid control films described herein can be prepared using an extrusion embossing process that allows continuous and/or roll-to-roll film fabrication. According to one suitable process, a flowable material is continuously brought into line contact with a molding surface of a molding tool. The molding tool includes an embossing pattern cut into the surface of the tool, the embossing pattern being the microchannel pattern of the fluid control film in negative relief. A plurality of microchannels is formed in the flowable material by the molding tool. The flowable material is solidified to form an elongated fluid control film that has a length along a longitudinal axis and a width, the length being greater than the width. The microchannels can be formed along a channel longitudinal axis that makes an angle that is greater than 0 and less than 90 degrees with respect to the longitudinal axis of the film. In some embodiments, the angle is less than 45 degrees, for example.

The flowable material may be extruded from a die directly onto the surface of the molding tool such that flowable material is brought into line contact with the surface of molding tool. The flowable material may comprise, for example, various photocurable, thermally curable, and thermoplastic resin compositions. The line contact is defined by the upstream edge of the resin and moves relative to both molding tool and the flowable material as molding tool rotates. The resulting fluid control film may be a single layer article that can be taken up on a roll to yield the article in the form of a roll good. In some implementations, the fabrication process can further include treatment of the surface of the fluid control film that bears the microchannels, such as plasma deposition of a hydrophilic coating as disclosed herein. In some implementations, the molding tool may be a roll or belt and forms a nip along with an opposing roller. The nip between the molding tool and opposing roller assists in forcing the flowable material into the molding pattern. The spacing of the gap forming the nip can be adjusted to assist in the formation of a predetermined thickness of the fluid control film. Additional information about suitable fabrication processes for the disclosed fluid control films are described in commonly owned U.S. Pat. Nos. 6,375,871 and 6,372,323, each of which is incorporated by reference herein in its respective entirety.

The fluid control films discussed herein can be formed from any polymeric materials suitable for casting or embossing including, for example, polyolefins, polyesters, polyamides, poly(vinyl chloride), polyether esters, polyimides, polyesteramide, polyacrylates, polyvinylacetate, hydrolyzed derivatives of polyvinylacetate, etc. Specific embodiments use polyolefins, particularly polyethylene or polypropylene, blends and/or copolymers thereof, and copolymers of propylene and/or ethylene with minor proportions of other monomers, such as vinyl acetate or acrylates such as methyl and butylacrylate. Polyolefins readily replicate the surface of a casting or embossing roll. They are tough, durable and hold their shape well, thus making such films easy to handle after the casting or embossing process. Hydrophilic polyurethanes have physical properties and inherently high surface energy. Alternatively, fluid control films can be cast from thermosets (curable resin materials) such as polyurethanes, acrylates, epoxies and silicones, and cured by exposure radiation (e.g., thermal, UV or E-beam radiation, etc.) or moisture. These materials may contain various additives including surface energy modifiers (such as surfactants and hydrophilic polymers), plasticizers, antioxidants, pigments, release agents, antistatic agents and the like. Suitable fluid control films also can be manufactured using pressure sensitive adhesive materials. In some cases the channels may be formed using inorganic materials (e.g., glass, ceramics, or metals). Generally, the fluid control film substantially retains its geometry and surface characteristics upon exposure to fluids.

In some embodiments, the fluid control layer may include a characteristic altering additive or surface coating. Examples of additives include flame retardants, hydrophobics, hydrophylics, antimicrobial agents, inorganics, corrosion inhibitors, metallic particles, glass fibers, fillers, clays and nanoparticles.

The surface of the film may be modified to ensure sufficient capillary forces. For example, the surface may be modified in order to ensure it is sufficiently hydrophilic. The films generally may be modified (e.g., by surface treatment, application of surface coatings or agents), or incorporation of selected agents, such that the film surface is rendered hydrophilic so as to exhibit a contact angle of 90° or less with aqueous fluids.

Any suitable known method may be utilized to achieve a hydrophilic surface on fluid control films of the present invention. Surface treatments may be employed such as topical application of a surfactant, plasma treatment, vacuum deposition, polymerization of hydrophilic monomers, grafting hydrophilic moieties onto the film surface, corona or flame treatment, etc. Alternatively, a surfactant or other suitable agent may be blended with the resin as an internal characteristic altering additive at the time of film extrusion. Typically, a surfactant is incorporated in the polymeric composition from which the fluid control film is made rather than rely upon topical application of a surfactant coating, since topically applied coatings may tend to fill in (i.e., blunt), the notches of the channels, thereby interfering with the desired fluid flow to which the invention is directed. When a coating is applied, it is generally thin to facilitate a uniform thin layer on the structured surface. An illustrative example of a surfactant that can be incorporated in polyethylene fluid control films is TRITON™ X-100 (available from Union Carbide Corp., Danbury, Conn.), an octylphenoxypolyethoxyethanol nonionic surfactant, e.g., used at between about 0.1 and 0.5 weight percent.

Other surfactant materials that are suitable for increased durability requirements for building and construction applications of the present invention include Polystep® B22 (available from Stepan Company, Northfield, Ill.) and TRITON™ X-35 (available from Union Carbide Corp., Danbury, Conn.).

A surfactant or mixture of surfactants may be applied to the surface of the fluid control film or impregnated into the article in order to adjust the properties of the fluid control film or article. For example, it may be desired to make the surface of the fluid control film more hydrophilic than the film would be without such a component.

A surfactant such as a hydrophilic polymer or mixture of polymers may be applied to the surface of the fluid control film or impregnated into the article in order to adjust the properties of the fluid control film or article. Alternatively, a hydrophilic monomer may be added to the article and polymerized in situ to form an interpenetrating polymer network. For example, a hydrophilic acrylate and initiator could be added and polymerized by heat or actinic radiation.

Suitable hydrophilic polymers include: homo and copolymers of ethylene oxide; hydrophilic polymers incorporating vinyl unsaturated monomers such as vinylpyrrolidone, carboxylic acid, sulfonic acid, or phosphonic acid functional acrylates such as acrylic acid, hydroxy functional acrylates such as hydroxyethylacrylate, vinyl acetate and its hydrolyzed derivatives (e.g. polyvinylalcohol), acrylamides, polyethoxylated acrylates, and the like; hydrophilic modified celluloses, as well as polysaccharides such as starch and modified starches, dextran, and the like.

As discussed above, a hydrophilic silane or mixture of silanes may be applied to the surface of the fluid control film or impregnated into the article in order to adjust the properties of the fluid control film or article. Suitable silanes include the anionic silanes disclosed in U.S. Pat. No. 5,585,186, as well as non-ionic or cationic hydrophilic silanes.

Additional information regarding materials suitable for microchannel fluid control films discussed herein is described in commonly owned U.S. Patent Publication 2005/0106360, which is incorporated herein by reference.

In some embodiments, a hydrophilic coating may be deposited on the surface of the fluid control layer by plasma deposition, which may occur in a batch-wise process or a continuous process. As used herein, the term "plasma" means a partially ionized gaseous or fluid state of matter containing reactive species which include electrons, ions, neutral molecules, free radicals, and other excited state atoms and molecules.

In general, plasma deposition involves moving the fluid control film through a chamber filled with one or more gaseous silicon-containing compounds at a reduced pressure (relative to atmospheric pressure). Power is provided to an electrode located adjacent to, or in contact with film. This creates an electric field, which forms a silicon-rich plasma from the gaseous silicon-containing compounds.

Ionized molecules from the plasma then accelerate toward the electrode and impact the surface of the fluid control film. By virtue of this impact, the ionized molecules react with, and covalently bond to, the surface forming a hydrophilic coating. Temperatures for plasma depositing the hydrophilic coating are relatively low (e.g., about 10 degrees C.). This is beneficial because high temperatures required for alternative deposition techniques (e.g., chemical vapor deposition) are known to degrade many materials suitable for multi-layer film 12, such as polyimides.

The extent of the plasma deposition may depend on a variety of processing factors, such as the composition of the gaseous silicon-containing compounds, the presence of other gases, the exposure time of the surface of the fluid control layer to the plasma, the level of power provided to the electrode, the gas flow rates, and the reaction chamber pressure. These factors correspondingly help determine a thickness of hydrophilic coating.

The hydrophilic coating may include one or more silicon-containing materials, such as silicon/oxygen materials, diamond-like glass (DLG) materials, and combinations thereof. Examples of suitable gaseous silicon-containing compounds for depositing layers of silicon/oxygen materials include silanes (e.g., $SiH_4$). Examples of suitable gaseous silicon-containing compounds for depositing layers of DLG materials include gaseous organosilicon compounds that are in a gaseous state at the reduced pressures of reaction chamber 56. Examples of suitable organosilicon compounds include trimethylsilane, triethylsilane, trimethoxysilane, triethoxysilane, tetramethylsilane, tetraethylsilane, tetramethoxysilane, tetraethoxysilane, hexamethylcyclotrisiloxane, tetramethylcyclotetrasiloxane, tetraethylcyclotetrasiloxane, octamethylcyclotetrasiloxane, hexamethyldisiloxane, bistrimethylsilylmethane, and combinations thereof. An example of a particularly suitable organosilicon compound includes tetramethylsilane.

After completing a plasma deposition process with gaseous silicon-containing compounds, gaseous non-organic compounds may continue to be used for plasma treatment to remove surface methyl groups from the deposited materials. This increases the hydrophilic properties of the resulting hydrophilic coating.

Additional information regarding materials and processes for applying a hydrophilic coating to a fluid control layer as discussed in this disclosure is described in commonly owned U.S. Patent Publication 2007/0139451, which is incorporated herein by reference.

Figure 4A:
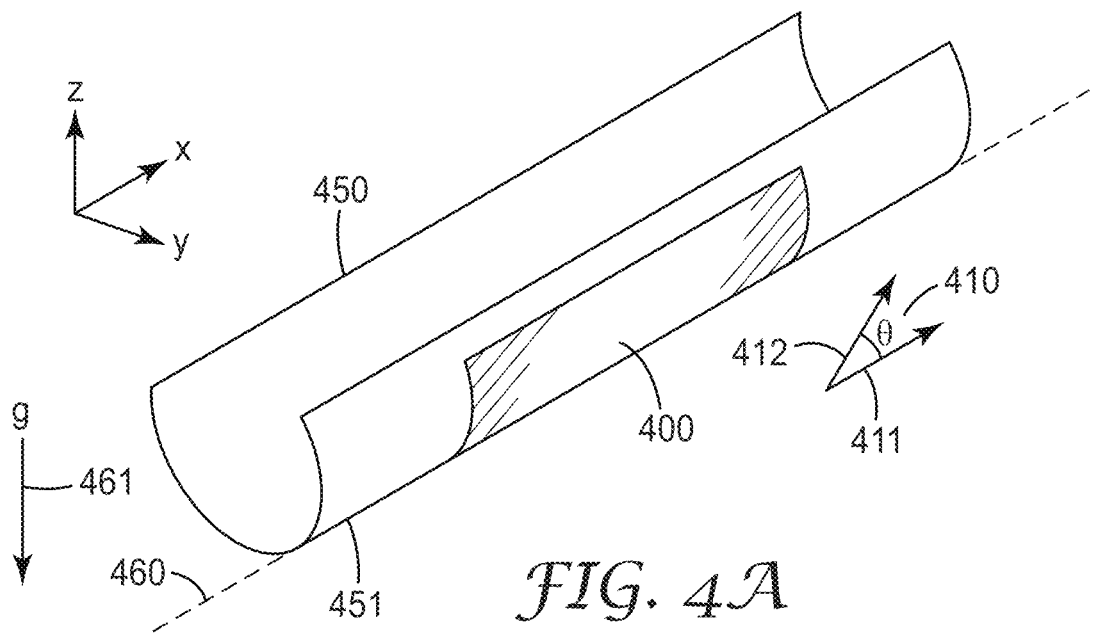
FIG. 4A illustrates a detailed view of a fluid control layer on an outer surface according to an example embodiment.

FIG. 4A illustrates a view of structure 450 that includes a region of fluid control features disposed on an outer surface 451 of the structure 450 according to an example embodiment. At least a portion of the outer surface 451 of the structure 450 has a cross section with a convex shape that extends along a longitudinal axis 411. The fluid control features include a plurality of elongated channels 400 that extend along a channel longitudinal axis 412 along at least a portion of the convex outer surface 451. The plurality of channels 400 may be arranged at an angle 410 between 0 and 90 degrees, e.g., less than 45 degrees, with respect to the longitudinal axis 411 of the structure 450. The channels 400 are configured to allow capillary movement of fluid in the channels and across the convex outer surface 451. In some embodiments, the channels 400 run along a channel axis 412 that may be at an angle 410 less than 45 degrees, in a range between about 5 and about 30 degrees, or in a range between 10 and 25 degrees, or between about 10 and 15 degrees with respect to the longitudinal axis 411 of the convex outer surface. As discussed above, each channel is defined by ridges running generally along the channel longitudinal axis 412.

In some embodiments, the plurality of channels is disposed in a layer that is permanently or temporarily disposed to the convex outer surface of the structure. For example, a tape having a fluid control layer that includes channels, as shown in FIG. 2B, may be adhered by an adhesive layer to the convex outer surface of the structure. In some embodiments, a coating is disposed on the outer surface and the plurality of channels may be formed in the coating. In yet other embodiments, the channels are formed in the convex outer surface of the structure, e.g., by cutting, embossing, or scribing.

The convex outer surface 451 includes a nadir line, illustrated by dashed line 460, which is the line running along the bottom of the convex structure 450 in relation to the direction of gravity 461. In the illustrated embodiment, the nadir line 460 is substantially parallel to the structure longitudinal axis 411 (x-axis in FIG. 4A) and a majority of the channels 400 intersect the nadir line due to their alignment along the channel axis 412 which intersects the longitudinal axis 411. When the fluid control channels 400 are saturated with liquid, any excess liquid will collect as droplets along the nadir line 460.

In some embodiments, the channels 400 are configured to produce a capillary force that has a component along the z axis opposing the gravitational force. The capillary force produced by the channels has a magnitude sufficient to overcome the gravitational force on the liquid in the channels. The capillary force can move the liquid through the channels so that the liquid flows up the sides of the convex surface, thus dispersing the liquid across the fluid control features. The dispersion of the liquid significantly increases the surface area to liquid volume ratio and decreases the amount of time needed to evaporate the liquid in the channels.

Figure 4B:
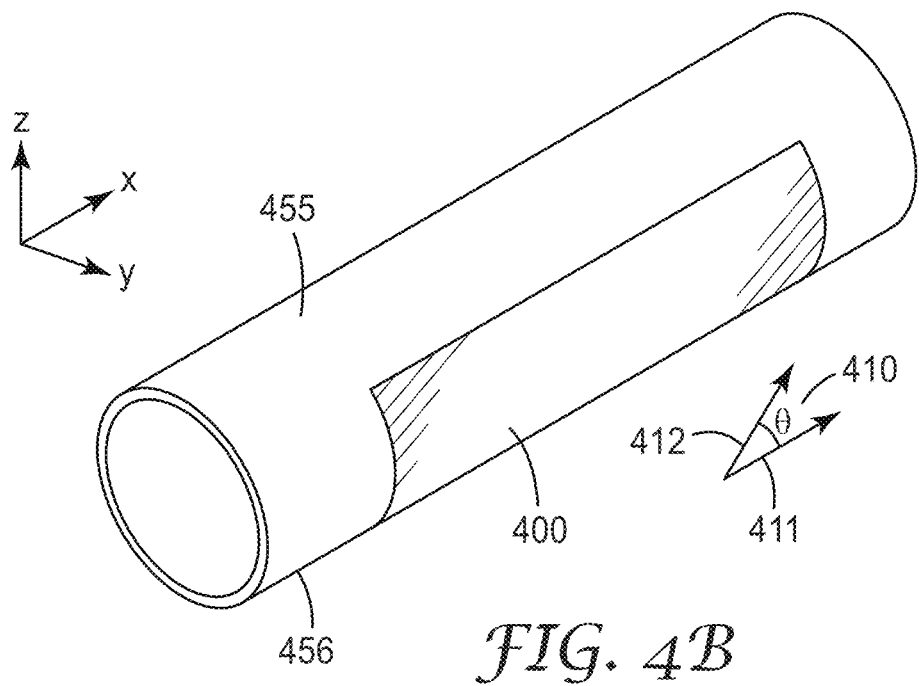
FIG. 4B illustrates a detailed view of a fluid control layer on a pipe according to an example embodiment.

In some embodiments, the structure having a convex outer surface may be a pipe, as illustrated in FIG. 4B. FIG. 4B shows fluid control features 400 as previously discussed disposed on a region of the bottom outer surface of a pipe 455 according to an example embodiment. The pipe convex surface 456 extends along a longitudinal axis 411. The plurality of channels 400 extends along a channel longitudinal axis 412 and at an angle 410 with respect to the pipe longitudinal axis 411.

Figure 5A:
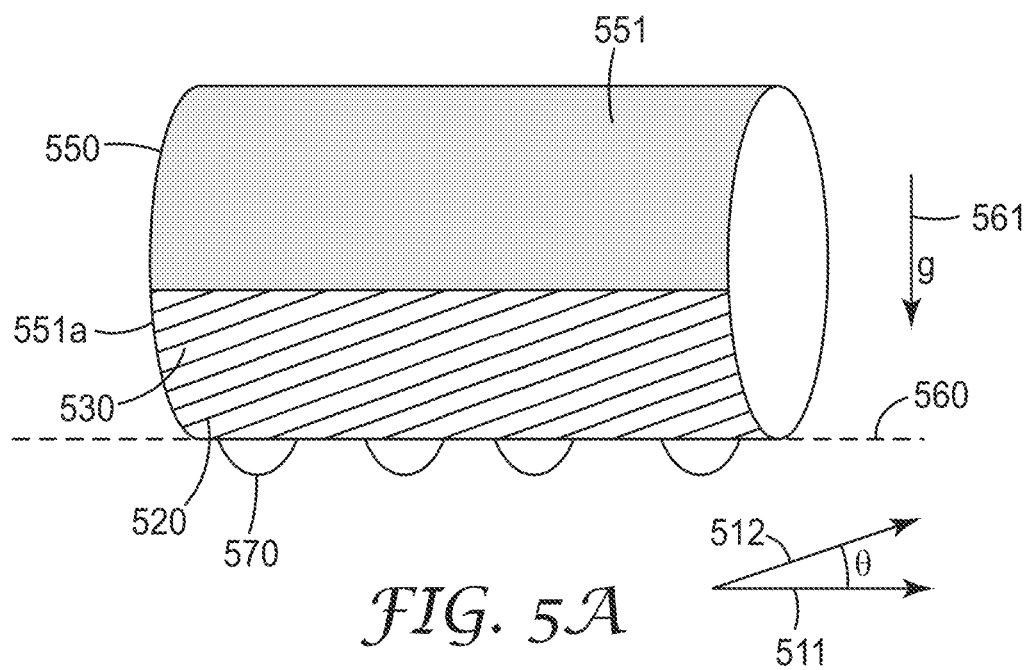
FIGS. 5A and 5B illustrate side and bottom views, respectively, of a structure with a plurality of channels disposed thereon, the channels running along an axis that makes an angle of less than 45 degrees with respect to the longitudinal axis of the structure according to an example embodiment.
Figure 5B:
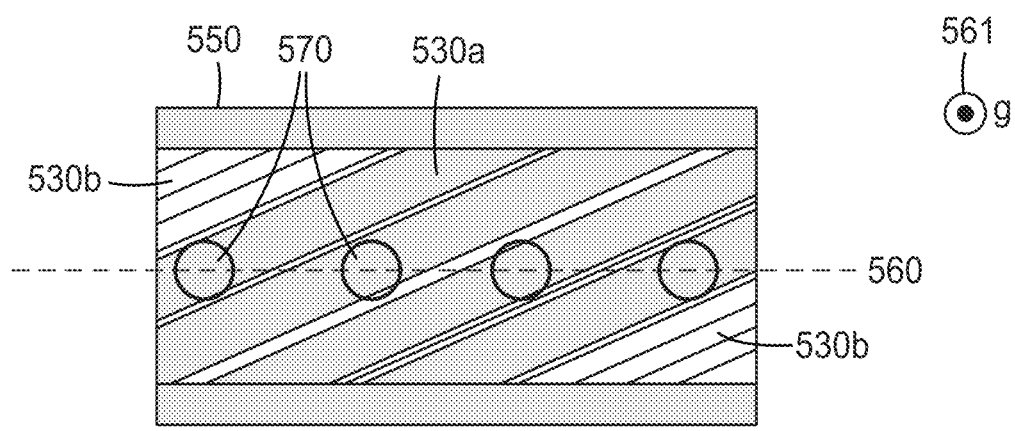

FIG. 5A is a side view and FIG. 5B is a bottom view of a pipe structure 550 having an outer surface 551 with fluid control features 530 disposed on a bottom portion 551a of the outer surface 551 of the structure 550, wherein the bottom portion 551a and top portion are so named due to their orientation with respect to the direction of gravitational force, g, 561. Fluid dispersing channels 530 defined by ridges 520 run along a channel axis 512 that is angled at angle θ with respect to the longitudinal axis 511 of the structure 550.

The outer surface 551 is associated with a nadir line, illustrated by dashed line 560, which is the line that connects the bottommost points of the outer surface 551. In the illustrated embodiment, the nadir line 560 is substantially parallel to the longitudinal axis 511 of the structure. A number of the channels 530 intersect the nadir line 560 due to their alignment along the channel axis 512 which intersects the longitudinal axis 511.

Each channel is associated with a certain saturation capacity or volume. FIG. 5B shows a number of fluid control channels 530a that are saturated with liquid and a number of fluid control channels 530b that are unsaturated. When the amount of fluid in a fluid control channel 530a exceeds the capacity of a channel, the channel is saturated and any liquid in excess of the channel capacity will collect as a droplet 570 along the nadir line 560. If fluid continues to collect in the droplet, the droplet may become so large that the gravitational force pulls the droplet away from the fluid control surface. As shown in FIGS. 5A and 5B, the liquid droplets 570 are disposed across the saturated channels 530a along the nadir line 560. For example, the droplets may be relatively evenly spaced along the bottom surface of the structure due to the arrangement of the channels.

Figure 5C:
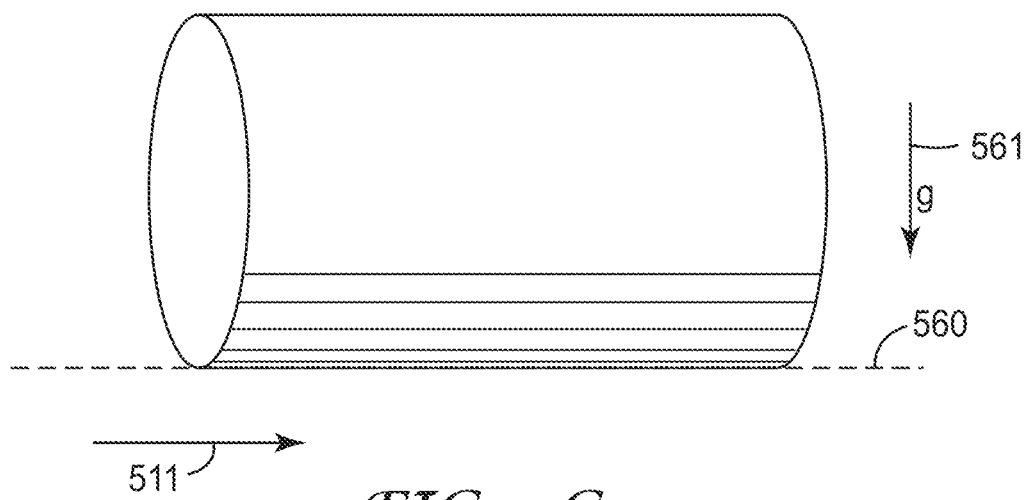
FIGS. 5C and 5D illustrate side and bottom views, respectively, of a structure with a plurality of channels disposed thereon, the channels running parallel to the longitudinal axis of the structure.
Figure 5D:
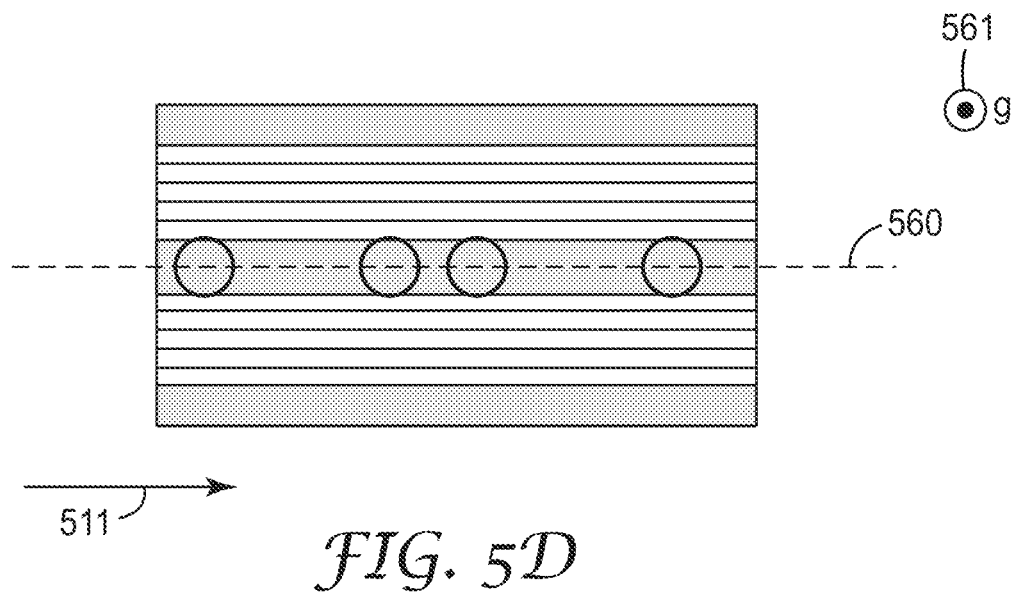
Figure 5E:
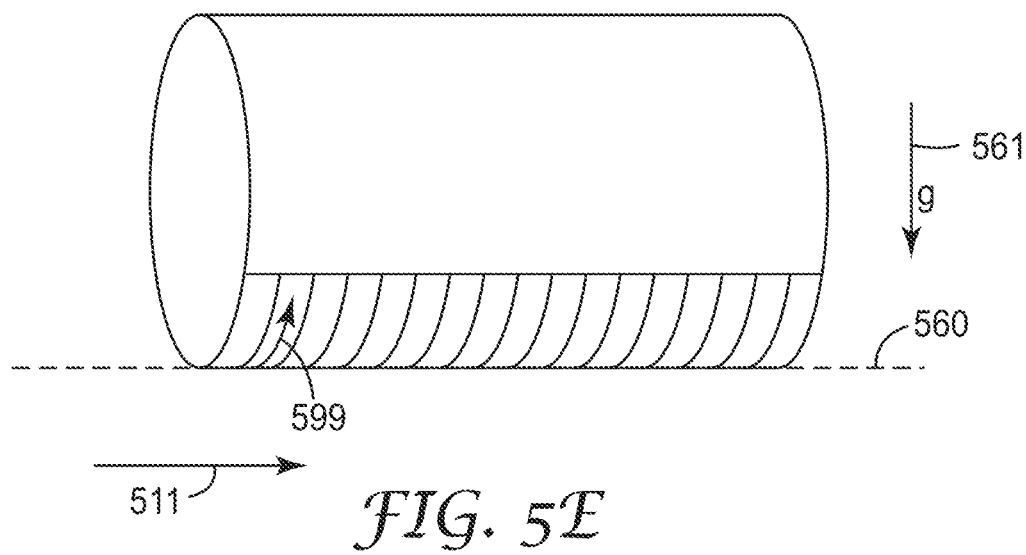
FIGS. 5E and 5F illustrate side and bottom views, respectively, of a structure with a plurality of channels disposed thereon, the channels running perpendicular to the longitudinal axis of the structure.
Figure 5F:
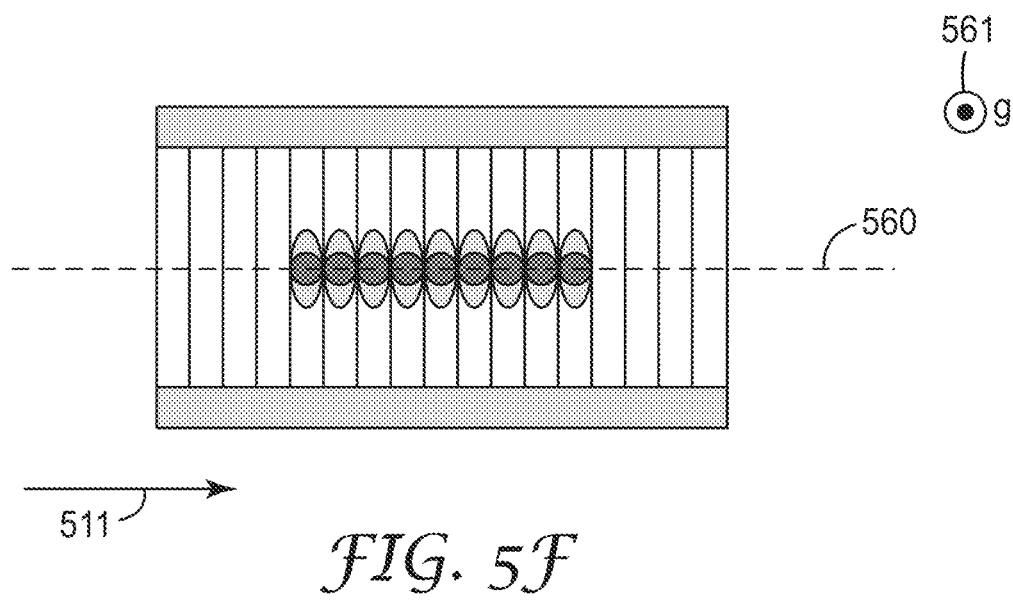
Figure 6:
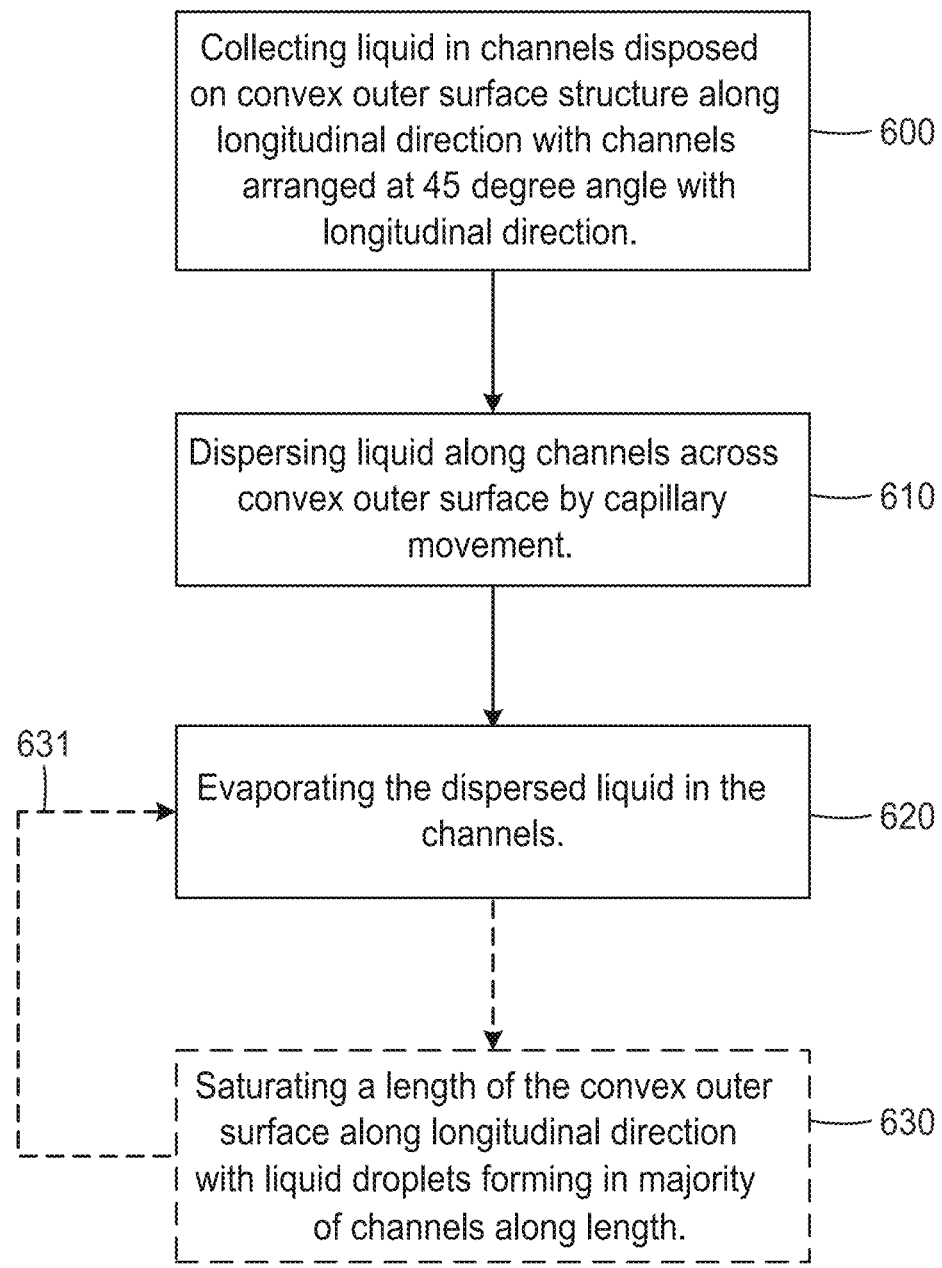
FIG. 6 is a flow diagram illustrating a method for fluid control according to an example embodiment.

Fluid control channels that are angled with respect to the nadir line, as shown in the embodiment of FIGS. 5A and 5B, provided for droplet formation in many channels. In contrast, in fluid control surfaces having channels that are closely aligned with the longitudinal axis of the structure, i.e., for θ equal to or approaching 0 degrees, (shown in FIG. 5C (side view) and FIG. 5D (bottom view) only one or only a few channels are disposed along or near the nadir line 560. A relatively large number of channels intersecting the nadir line produces greater overall fluid holding capacity of the fluid control surface. Each of the channels is designed to disperse the fluid along the channel by wicking. Thus, embodiments employing angled channels engage more channels at the nadir line, providing greater fluid containing capacity, resulting in smaller volume droplets of excess fluid and/or reducing droplet detachment. Smaller volume droplets evaporate more quickly and reduce droplet detachment resulting in less contamination from condensing liquids.

Fluid control layers having channels that are angled with respect to the longitudinal axis of the convex surface i.e., along the nadir line of a pipe, as shown in FIGS. 5A and 5B, can have increased acquisition of fluid along the edges of the film when compared with the edge acquisition of fluid control surfaces having channels that are substantially parallel with the longitudinal axis of outer surface. For example, consider the scenario wherein water droplets condense on the outer surface of a pipe and run down the pipe towards the nadir line. When a fluid control layer or surface is present along a lower portion of the pipe, the condensed droplets encounter an edge of a fluid control surface. If the fluid control surface has channels at the edge that are closely aligned with the nadir line, the droplets are impeded from entering the fluid control surface by a ridge near the edge that runs along the nadir line. Thus, ridge impedes edge acquisition of fluid into the fluid control channels and the droplets can become "pinned" at the edge by the ridge. In contrast, if the fluid control surface includes channels that are angled with respect to the nadir line as disclosed herein, the edge includes a number of channel openings that enhance edge acquisition of the fluid.

A configuration wherein the angle between the channel axis and the longitudinal axis of the structure is equal to or approaching 90 degrees (as shown in side view in FIG. 5E and bottom view in FIG. 5F) engages many channels along the nadir line 560 of the structure during saturation of the fluid control surface. However, the gravitational force component that must be overcome by capillary force to move liquid in a direction towards the top of the structure (along arrow 599) by wicking is increased when compared channels that make a shallower angle, e.g., less than 45 degrees, with respect to the longitudinal axis of the structure. Thus, fluid control surfaces having channels angled at less than 45 degrees with respect to the longitudinal axis are capable of dispersing fluid a greater amount of fluid when compared to similarly structured channels that are oriented at 90 degrees with respect to the longitudinal axis of the structure.

FIG. 6 is a flow diagram of a process of fluid management using fluid control channel features as described herein. In some implementations, such as a pipe, the structure has an outer surface that is convex, with the nadir line of the convex surface connecting the lowest points of the outer surface. The nadir line aligns with the structure longitudinal axis. The fluid control channels are arranged on a surface of a structure such that the channel axis is oriented at an angle to the longitudinal axis of the structure. The fluid control features can be disposed on the outer structure in one or more regions and not in others, e.g., the fluid control features can be disposed on one or more regions at the bottom of the outer surface (in relation to gravity) and not on the top of the outer surface. However, the fluid control features can be disposed so as to completely cover the outer surface. Disposing the fluid control features in some regions but not in others (rather than covering the entire outer surface) can enhance fluidic access to the channels because channel openings designed to facilitate entry of liquid into the channels are exposed at the edges of the fluid control channels. Where the fluid control channels are formed on the outer surface of the pipe, there may be no change of thickness at the channel openings. In some implementations, such as a ceiling, the structure can be a relatively flat surface.

Arranging the fluid control channels at an angle to a pipe's outer surface can be accomplished by various techniques. For example, a fluid control layer that includes the fluid control channels may be affixed to the pipe by adhering or otherwise affixing the fluid control layer to the outer surface of the pipe. In some embodiments, the fluid control layer is part of a tape, which an adhesive layer disposed on the surface of the fluid control layer opposite to the fluid control channels. Suitable techniques for forming a fluid control layer useful for tape implementations include extrusion, embossing, laser cutting, and/or thermosetting. In some implementations, the channels run along an axis that makes an angle less than 45 degrees with the longitudinal axis of the tape. In these implementations installation of the tape on the pipe can involve applying at least a strip of the tape along the nadir line of the pipe. In some implementations, where the channels run parallel to the longitudinal axis of the tape, the tape itself can be disposed at an angle less than 45 degrees on the pipe, e.g., by spiral wrapping the fluid control tape around the pipe.

In some (non-tape) implementations, the fluid control channels may be formed directly on the outer surface pipe, e.g., during manufacture of the pipe, or may be formed on a layer deposited on the pipe outer surface. Suitable techniques for forming a pipe having a fluid control layer on the outer surface include knurling, embossing, hot lamination, and the like.

Liquid collects 600 in the fluid control channels, e.g., from fluid that is sprayed directly on the fluid control layer or that condenses. In some cases, fluid may collect in the fluid control channels via channel openings disposed at the edges of the fluid control layer. The fluid control channels are configured to disperse 610 the liquid in the channels and by wicking the liquid through the channels and across the surface of the structure. The dispersion of liquid increases the surface area to volume ratio of the liquid and promotes evaporation 620 of the liquid.

In some scenarios, one or more of the channels may become saturated 630 with liquid wherein the amount of liquid exceeds the volume capacity of the saturated channels. In such a scenario, droplets may form that hang downward from the fluid control layer. As the liquid in the channels evaporates, additional liquid from the droplets is dispersed in the channels, shrinking the volume of the droplets. The process continues 631 until the droplets disperse.

Figure 7:
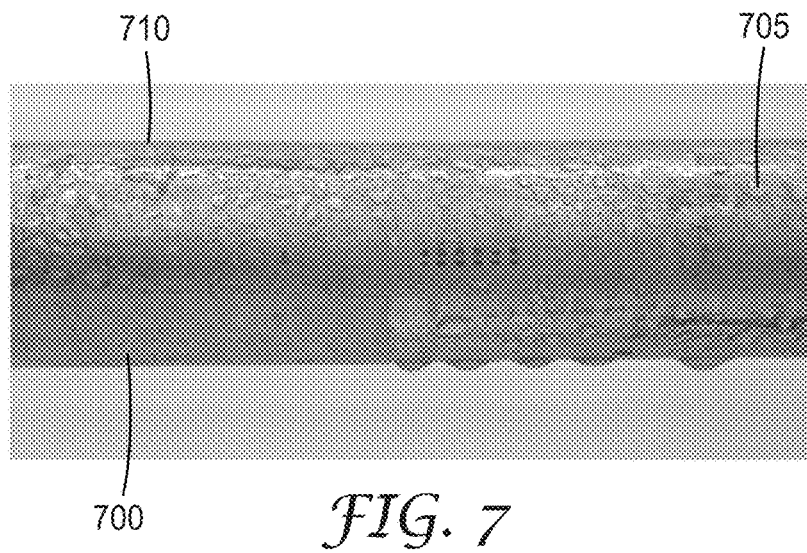
FIG. 7 illustrates a pipe structure with and without a fluid control layer disposed on the surface of the pipe structure.

FIG. 7 is a photograph of the pipe structure with and without a microchannel fluid control layer disposed on the surface of the pipe. As shown in FIG. 7, a section of a microchannel fluid control layer 700 prepared as a microchannel tape as discussed above is disposed on a portion of the pipe 710. The pipe 710 also includes a section that does not have any type of coating or adhesive disposed thereon. As can be seen in FIG. 7, liquid droplets 705 have accumulated in various locations in the sections of the pipe 710 where there is no fluid control layer. No droplets can be seen on the portion of the pipe structure 710 that includes the fluid control layer 700.

Figure 8A:
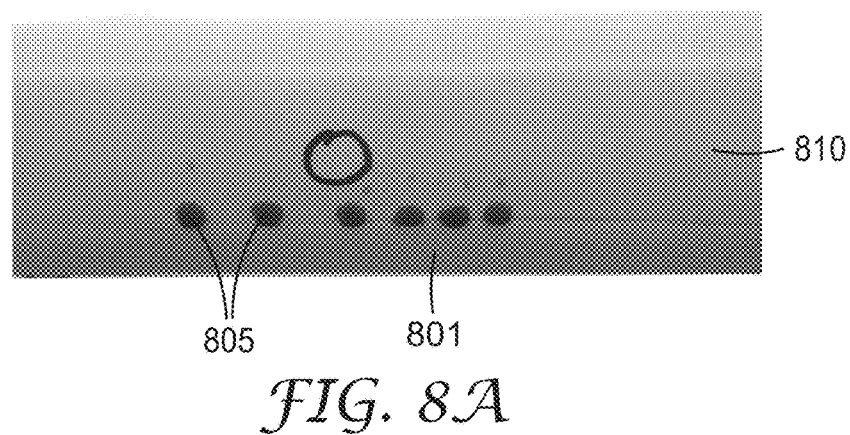
FIGS. 8A and 8B are photographs of a pipe with fluid control features oriented in different directions.

FIG. 8A shows a pipe structure 810 with a microchannel fluid control layer 801 that has a plurality of channels extending along an axis parallel to a longitudinal axis of the pipe structure 810 and substantially perpendicular to the direction of the force of gravity. Liquid droplets 805 are present at the location where the bare pipe structure 810 meets the fluid control layer 801. This edge effect from parallel oriented channels is a result of ridges that impede the entry of into the channels because the channel ridges create a raised barrier at the intersection of the exposed pipe structure 810 and the fluid control layer 801.

Figure 8B:
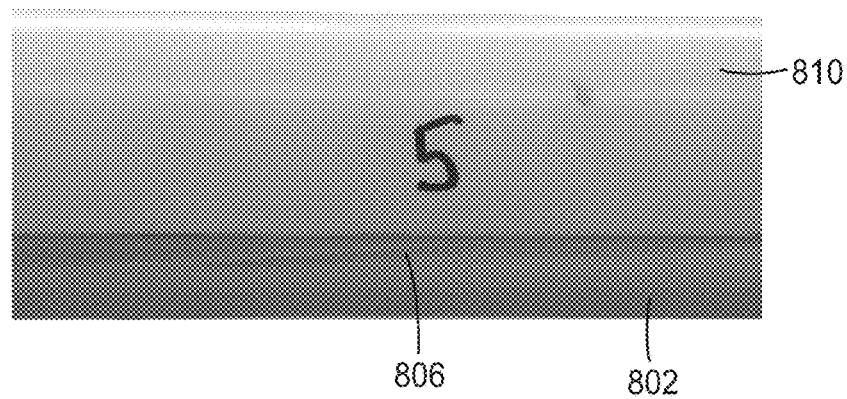

FIG. 8B shows a pipe structure 810 with a fluid control layer 802 that has a plurality of channels extending along an axis that is angled with respect to the pipe longitudinal axis. In contrast to the scenario illustrated by FIG. 8A that shows a build-up of water droplets at the fluid control layer edge, the fluid control layer with angled channels has channel openings that allow liquid 806 to enter the channels of the fluid control layer. As previously discussed, the thickness of the fluid control layer at the channel openings may be selected to facilitate liquid entering the channel openings.

EXAMPLES

Preparation of microchannel fluid control film:

Microchannel fluid control films were prepared by extrusion embossing a low density polyethylene polymer (DOW 955i) on to a cylindrical tool according to the process described in U.S. Pat. No. 6,372,323. The tool was prepared by diamond turning the pattern of grooves shown in FIG. 2B in negative relief. The grooves were cut at a helix angle of 80 degrees relative to the cylinder axis, producing films with channels oriented at 20 degrees relative to the longitudinal (down web) direction of the film. The polymer was melted in an extruder at 365 F and passed through a die into a nip between the tool roll heated to 200 F and smooth 70 F backup roll using a nip pressure of 500 PSI. The extruder speed and tool rotation speed were adjusted to produce a film with an overall thickness of 290 microns. A hydrophilic coating bearing silane and siloxane groups was then applied to the film using a parallel plate capacitively coupled plasma reactor as described in U.S. Patent Publication 2007/0139451. The chamber has a powered electrode area of 27.75 ft2 and an electrode spacing of 0.5 in After placing the fluid transfer film on the powered electrode, the reactor chamber was pumped down to a base pressure of less than 1.3 Pa (10 mTorr). A mixture of 2% $SiH_4$ in Ar and, separately, O2 gas were flowed into the chamber at rates of 4000 standard cubic centimeters per minute (SCCM) and 500 SCCM, respectively. The pressure was regulated to 990 mTorr. Treatment was carried out using a plasma enhanced chemical vapor deposition (CVD) method by coupling RF power into the reactor at a frequency of 13.56 MHz and an applied power of 1000 watts. Treatment time was controlled by moving the fluid transfer film through the reaction zone at a rate of 10 ft/min, resulting in an exposure time of 37 s. Following the treatment, the RF power and the gas supply were stopped and the chamber was returned to atmospheric pressure.

Preparation of Microchannel Fluid Control Tape

Approximately three foot by 10 inch sections of film prepared as described above were laminated to 3 foot by 10 inch sections of double coated tape (9425 HT, 3M Company, St. Paul Minn.) by aligning the film and adhesive followed by smoothing with a roller.

Example 1—Vertical Wicking Height

The vertical wicking height of the microchannel fluid control film prepared as discussed above (see, Preparation of microchannel fluid control film) was measured by first cutting the film into 1 cm strips in line with the channel direction. Three strips were then mounted on a thin aluminum sheet using double sided adhesive, with the base if the strips aligned to the bottom of the sheet. This assembly was then placed in a trough containing a deionized water solution containing hydroxypyrenetrisulfonic acid trisodium salt (Aldrich Chemical Company, H1529, 70 mg/500 ml). The height of the liquid after two minutes was determined using a hand held UV light (365 nm) to visualize the fluorescent dye in the solution (356 nm). Using this method, the average capillary height was 16 cm.

Example 2—Evaporation Rate as a Function of Channel Angle on a Pipe

Microchannel tape was prepared as described above (see, Preparation of microchannel fluid control tape). Using a protractor, two inch wide by 19 inch long samples having the channel angles shown in Table 1 were cut from the microchannel tapes, with 0 degree defined as channels oriented parallel to the length direction and 90 degree oriented perpendicular. The sections were adhered end-to-end along the bottom of a 2 inch PVC pipe (JM Eagle SCH40DWV PVC1120). After adhering, the ends of the pipe were supported by two laboratory ring stands. A level was then placed on the pipe followed by adjusting the end heights until the pipe was level. The films were then saturated with deionized water using a pressurized tank sprayer (Roundup EZ Sprayer, The Fountainhead Group, NY). The sprayer tip was set on "mist" and the flow directed towards the films from underneath the pipe. The spray was continued using a back and forth motion until hanging drops were formed on the films and on the control regions of the pipe containing no film. Evaporation of the water in the film and control regions was monitored using an infrared camera (FLIR Model T650, Flir Systems AB, Sweden).

The evaporation data is for a fully saturated system (hanging drops present on the pipe and the films). This data is consistent with our earlier observations, where longer channels (edge to edge) provide more area for the residual drops to spread. For the zero case the drops align on the same channels and take slightly longer to evaporate.

Figure 9:
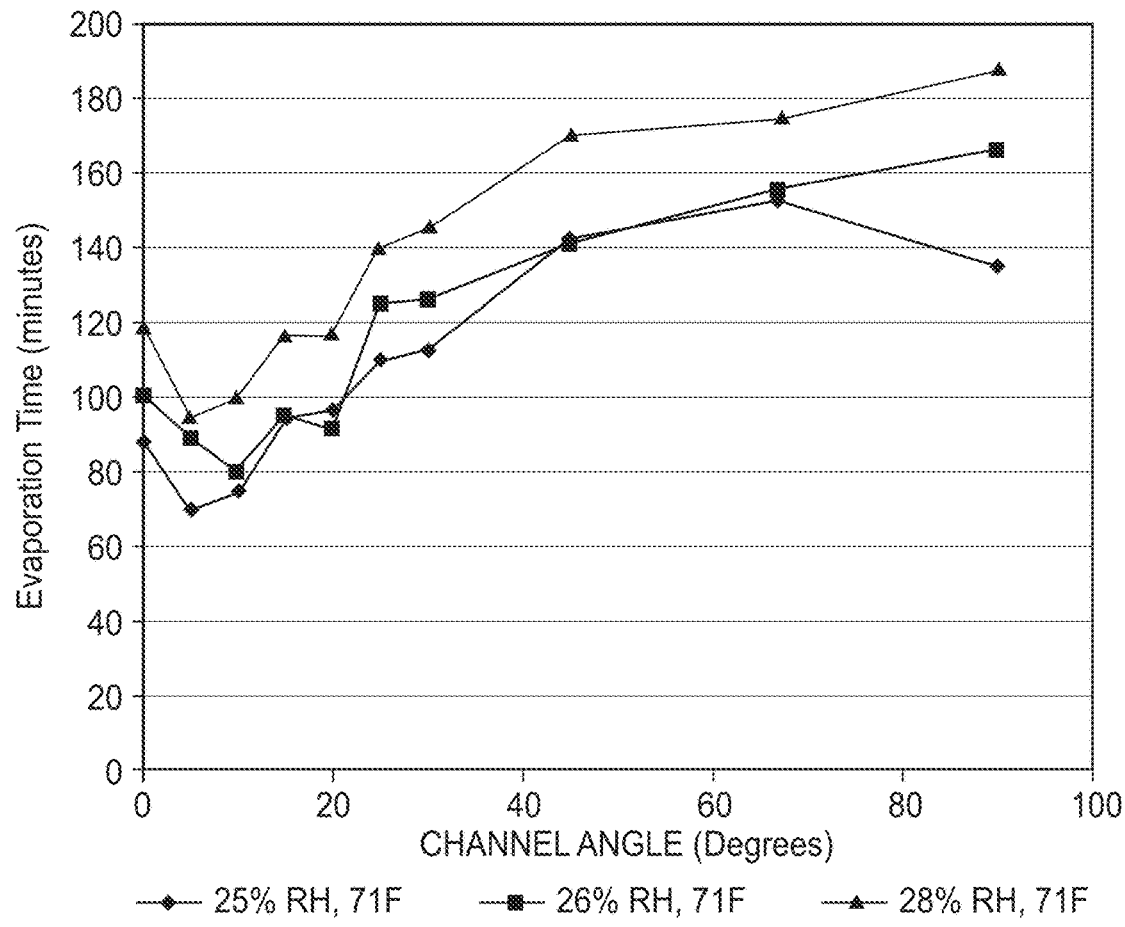
FIG. 9 is a graph of evaporation time with respect to channel angle.

Table 1 shows evaporation time in minutes vs. channel angle with respect to the longitudinal angle of the pipe at 71 degrees F. and 25% relative humidity (RH), 26% RH, and 27% RH. FIG. 9 shows a graphical representation of the data in Table 1.

TABLE 1

Evaporation time in minutes as a function of channel angle

| channel angle | evaporation time (minutes) | | |
|---|---|---|---|
| | 25% RH, 71F | 26% RH, 71F | 28% RH, 71F |
| 0 | 88 | 100 | 119 |
| 5 | 70 | 89 | 95 |
| 10 | 75 | 80 | 100 |
| 15 | 94 | 95 | 117 |
| 20 | 96 | 91 | 117 |
| 25 | 110 | 125 | 140 |
| 30 | 113 | 126 | 146 |
| 45 | 142 | 141 | 171 |
| 67 | 153 | 155 | 176 |
| 90 | 135 | 166 | 188 |
| pipe (no film) | 325 | 270 | 298 |

The data shown in the graph of FIG. 9 and Table 1, indicates ranges of channel angles that provide the lowest evaporation time. The lowest evaporation times correspond to channel angles in a range between about 5 degrees and about 30 degrees, or about 5 degrees to about 20 degrees or in a range of about 10 degrees to about 15 degrees.

Example 3—Edge Pinning

To investigate the edge pinning phenomenon, a fifty microliter droplet of water was placed on the pipe 1 cm above the edge of a microchannel fluid control film fabricated as discussed above. This amount was sufficient to move down the pipe by gravity and contact the edge of the film. The droplet pinned on the zero film (did not wick in) but rapidly entered the film for all the other angles.

Table 2 indicates the presence or absence of edge pinning when the channels are disposed at various angles with respect to the longitudinal axis of the pipe.

TABLE 2

Presence/absence of edge pinning vs. channel angle

| channel angle | edge pinning |
|---|---|
| 0 | yes |
| 5 | no |
| 10 | no |
| 15 | no |
| 20 | no |
| 25 | no |
| 30 | no |
| 45 | no |
| 67 | no |
| 90 | no |

Example 4—Evaporation Time of Microchannel Film Compared to Bare Pipe

Figure 10:
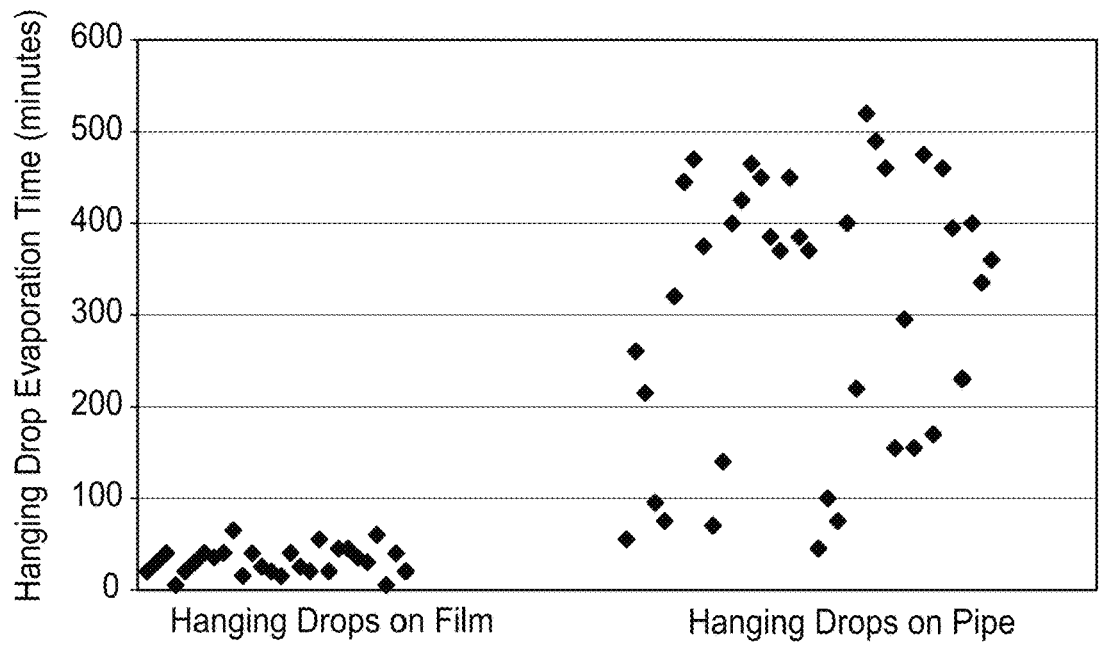
FIG. 10 illustrates evaporation time of hanging water droplets on a cooled pipe having a fluid control film in accordance with embodiments discussed herein compared with a bare pipe.

A 2 inch×8 inch section of microchannel tape having a 20 degree angle was prepared and adhered to a three foot section of 2 inch diameter steel pipe as described above. The pipe was fitted with threaded end caps containing tubing connectors. A recirculating bath (ThermoFlex 1400, Thermo Scientific) was attached to the tubing adapters. 45 F water was recirculated through the pipe. Water vapor generated from a commercial steam cleaner (ProPlus 300CS, Diamer Industries, Woburn, Mass.) was directed towards the pipe using a back and forth motion for a time sufficient to generate "fingering" drops of condensate down the side of the pipe and film. When the fingering drops accumulated at the bottom of the pipe as hanging drops the steam was discontinued. A camera mounted on a tripod was used to collect images of the hanging drops every 5 minutes for 8 hours. The images were examined to determine when the drops evaporated from the film and from the pipe. The experiment was repeated 6 times. The accumulated drop evaporation data is shown in FIG. 10. FIG. 10 shows the experimental results indicating that all hanging drops on the microchannel film evaporated within about 75 minutes whereas some hanging drops on the bare pipe took over 500 minutes to evaporate.

Various embodiments are described herein including the following items:

Item 1. An article, comprising:
    a structure having an outer surface extending along a longitudinal axis, at least a portion of a cross section of the outer surface being convex; and
    fluid control channels extending along a channel longitudinal axis along at least a portion the convex surface, the channel longitudinal axis making an angle between 0 and 90 degrees with respect to the longitudinal axis of the outer surface, the fluid control channels configured to allow capillary movement of liquid in the channels and across the convex surface.

Item 2. The article of item 1, wherein the angle is less than 45 degrees.

Item 3. The article of item 1, wherein the angle is between 5 and 30 degrees.

Item 4. The article of any of item 1 through 3, wherein the fluid control channels are defined by linear, parallel ridges that run along the channel longitudinal axis.

Item 5. The article of any of items 1 through 4, wherein:
the fluid control channels are disposed in a tape adhered to the convex surface;
the fluid control channels are disposed in a coating disposed on the convex surface; or
the fluid control channels are formed in the convex surface.

Item 6. The article of any of items 1 through 5, wherein the convex surface is a surface of a pipe.

Item 7. The article of any of items 1 through 6, wherein the convex surface includes a nadir line comprising lowest points on the convex surface with respect to the direction of gravity, wherein the nadir line is substantially parallel to the longitudinal axis of the structure and a majority of the channels intersect the nadir line.

Item 8. The article of any of items 1 through 7, wherein the channels are configured to produce a capillary force on the liquid in the channels that is greater than the gravitational force on the liquid.

Item 9. A fluid control layer having a layer longitudinal axis, the fluid control layer comprising channels extending along a channel longitudinal axis, the channel longitudinal axis making an angle of less than 45 degrees with respect to the layer longitudinal axis, the channels dimensioned and arranged to provide capillary forces that overcome the gravitational force on water in the channels and cause capillary movement of water in the channels and across the fluid control layer in opposition to the gravitational force.

Item 10. The fluid control layer of item 9, further comprising an adhesive layer disposed on the fluid control layer.

Item 11. The assembly of item 10, further comprising a release layer disposed on the adhesive layer.

Item 12. The fluid control layer of any of items 9 through 11, wherein the angle is between about 5 and 30 degrees.

Item 13. The fluid control layer of any of items 9 through 12, wherein the channels include primary channels, each primary channel comprising first and second primary ridges having a height $h_p$.

Item 14. The fluid control layer of item 13, wherein the channels further comprise secondary channels disposed between the first and second primary ridges of the primary channels, each secondary channel associated with at least one secondary ridge having a height $h_s$, where $h_p > h_s$.

Item 15. The fluid control layer of any of items 9 through 14, wherein the channels comprise first and second ridges that extend substantially normal to the surface of the fluid control film.

Item 16. The fluid control layer of any of items 9 through 14, wherein the channels comprise first and second side surfaces that extend at an angle to each other.

Item 17. The fluid control layer of any of items 9 through 16, wherein:
the channels comprise first and second ridges and a thickness of the fluid control layer at a location between the ridges is $t_v$; and
further comprising an adhesive layer having a thickness, $t_a$, wherein $t_v + t_a$ is less than about 300 μm.

Item 18. The fluid control layer of any of items 9 through 17, wherein the fluid control layer comprises a hydrophilic surface.

Item 19. A fluid control method, comprising:
collecting liquid in channels disposed on a convex outer surface of a structure, the convex outer surface extending along a longitudinal axis and having a nadir line comprising lowest points of the convex surface with respect to the direction of gravity, the channels arranged along a channel longitudinal axis that makes an angle between 0 and 90 degrees with respect to the nadir line of the convex outer surface of the structure;
dispersing the liquid along the channels and across the convex outer surface by capillary movement of the liquid in the channels; and
evaporating the dispersed liquid.

Item 20. The method of item 19, wherein the angle is less than 45 degrees.

Item 21. The method of item 19, wherein the angle is between 5 and 30 degrees with respect to the longitudinal axis.

Item 22. The method of any of items 19 through 21, wherein collecting the liquid in the channels comprises capillary wicking of the liquid into the channels.

Item 23. The method of any of items 19 through 22, wherein gravity opposes the capillary movement of the liquid in the channels.

Item 24. The method of any of items 19 through 23, wherein the longitudinal axis of the convex outer surface is oriented substantially perpendicularly with respect to the gravitational direction.

Item 25. The method of any of items 19 through 24, further comprising saturating a length of the convex outer surface along the longitudinal axis, wherein saturating includes forming liquid droplets in a majority of the channels along the length.

Item 26. A fluid control layer, comprising channels extending across the fluid control layer along a channel longitudinal axis, the channels configured to provide capillary movement of liquid in the channels and across the fluid control layer, at least some channels having a first opening at a first edge of the fluid control layer and a second opening at a second edge of the fluid control layer that intersects the first edge, a thickness of the fluid control layer at the openings configured to provide capillary movement of the liquid into the channels.

Item 27. The article of item 26, wherein the channel longitudinal axis makes an angle of less than 45 degrees with respect to a longitudinal axis of the fluid control layer.

Item 28. A process for forming a fluid control film, comprising:
continuously bringing a flowable material and a molding surface of a molding tool into line contact with each other;
forming a plurality of microchannels within the flowable material; and
solidifying the flowable material to form an elongated fluid control film, the fluid control film having a length along a longitudinal axis and a width, the length being greater than the width, wherein the microchannels are formed along a channel longitudinal axis, the channel longitudinal axis making an angle greater than 0 degrees and less than 90 degrees with respect to the longitudinal axis of the film.

Item 29. The process of item 28, further comprising applying a surface treatment to a surface of the fluid control film that includes the microchannels.

Item 30. The process of item 29, wherein applying the surface treatment comprises a plasma treatment that forms a hydrophilic surface.

In the forgoing description, reference is made to the accompanying set of drawings that form a part of the description hereof and in which are shown by way of illustration of several specific embodiments. It is to be understood that other embodiments are contemplated and may be made without departing from the scope of the present disclosure. The detailed description, therefore, is not to be taken in a limiting sense.

Unless otherwise indicated, all numbers expressing feature sizes, amounts, and physical properties used in the specification and claims are to be understood as being modified in all instances by the term "about" Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Particular materials and dimensions thereof recited in the disclosed examples, as well as other conditions and details, should not be construed to unduly limit this disclosure. Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. An article, comprising:
   a structure having an outer surface extending along a longitudinal axis, at least a portion of a cross section of the outer surface being convex, the longitudinal axis of the outer surface oriented substantially perpendicularly with respect to the gravitational direction; and
   fluid control channels extending along a channel longitudinal axis along at least a portion the convex surface, the channel longitudinal axis making an angle between 0 and 90 degrees with respect to the longitudinal axis of the outer surface, the fluid control channels configured to allow capillary movement of liquid in the channels and across the convex surface, the channels configured to produce a capillary force on the liquid in the channels that is greater than the gravitational force on the liquid.

2. The article of claim 1, wherein the angle is less than 45 degrees.

3. The article of claim 1, wherein the angle is between 5 and 30 degrees.

4. The article of claim 1, wherein the fluid control channels are defined by linear, parallel ridges that run along the channel longitudinal axis.

5. The article of claim 1, wherein:
   the fluid control channels are disposed in a tape adhered to the convex surface;
   the fluid control channels are disposed in a coating disposed on the convex surface; or
   the fluid control channels are formed in the convex surface.

6. The article of claim 1, wherein the convex surface is a surface of a pipe.

7. The article of claim 1, wherein the convex surface includes a nadir line comprising lowest points on the convex surface with respect to the direction of gravity, wherein the nadir line is substantially parallel to the longitudinal axis of the structure and a majority of the channels intersect the nadir line.

* * * * *